Figure 1:
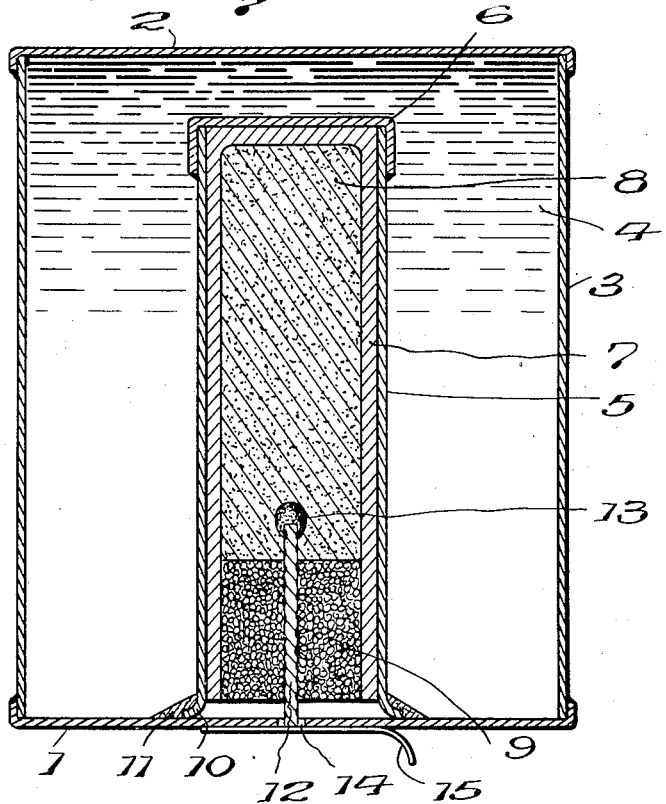

Sept. 4, 1945.   W. A. CALDWELL   2,384,278
HEATER FOR CANNED FOODS AND BEVERAGES
Filed Jan. 9, 1942   2 Sheets-Sheet 1

Inventor
Walter A. Caldwell,
By K. P. McElroy
Attorney

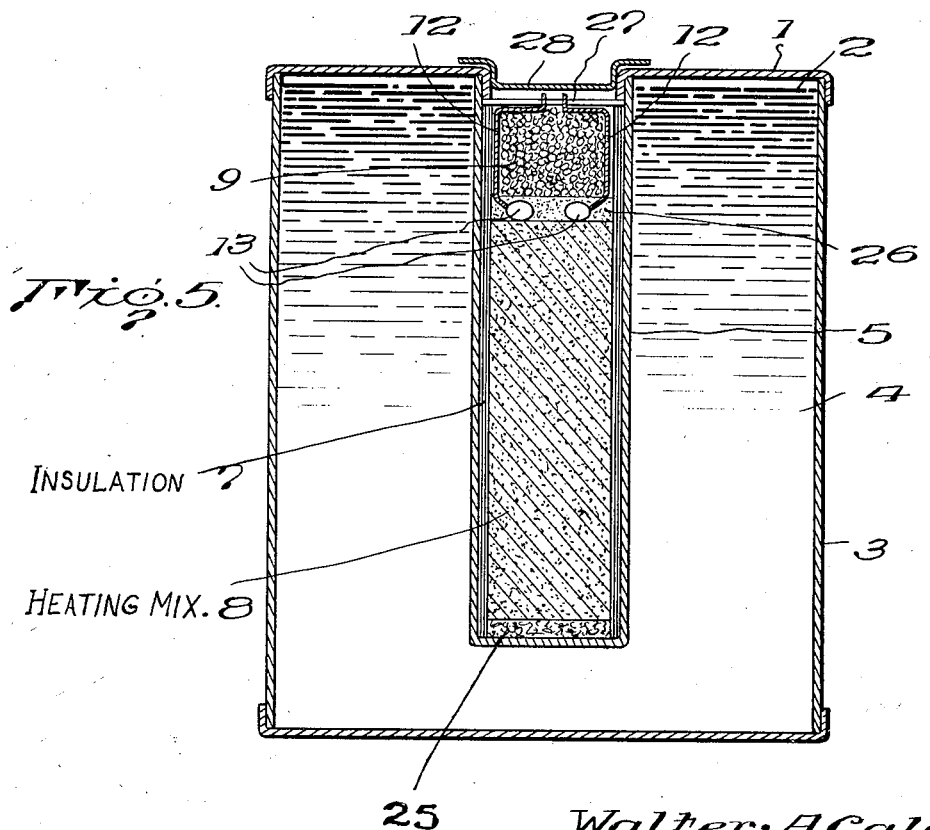

Patented Sept. 4, 1945

2,384,278

UNITED STATES PATENT OFFICE 2,384,278

HEATER FOR CANNED FOODS AND BEVERAGES

Walter Anderson Caldwell, Seamill, Scotland, assignor to Imperial Chemical Industries Limited, a corporation of Great Britain Application January 9, 1942, Serial No. 426,233
In Great Britain October 25, 1940

12 Claims. (Cl. 126—262)

The present invention relates to canned foods and beverages and more particularly to the provision of a closed can containing a comestible through which heat can be transferred by convection and intended to be consumed hot, having the necessary heat generating means integral with the can and immersed in the comestible, the heating material employed being such as to give rise to no inflammable vapours on storage.

Apart from its obvious attractions for domestic use, an article of this description will be especially useful to persons on active service, in aircraft, in air raid shelters and more generally to those who require hot foodstuffs or beverages in situations where ordinary heating means are not available. The invention is applicable to comestibles of a liquid or semi-liquid consistency and to those which readily assume such a consistency when heated, for instance, soups, purees, stews, fruit and vegetables canned in liquids, and the like. The invention is especially applicable to hermetically sealed soldered cans.

It is already known to supply the so-called solidified spirit, which consists of a jelly of soap, nitrocellulose or the like permeated with a volatile alcoholic fuel, in containers adapted to facilitate the positioning of a food container over the flame, but the spirit flame is easily blown out and solidified spirit cannot be used in an immersion heater integral with the cans. It has also been proposed to heat foodstuffs by means of chemical compositions which generate heat when moistened, but the compositions employed have such a low heat evolution that they would require to be used in so large a quantity that they cannot usefully be accommodated in the can after the fashion of an immersion heater.

According to the present invention a container comprises a closed compartment charged with a comestible through which heat can be conducted by convection, a second compartment within the first compartment but closed off therefrom and provided with a vent to the exterior of the container and charged with a composition comprising ingredients capable on ignition of undergoing chemical reaction with the generation of heat but substantially without the evolution of inflammable gas or vapour, and means operable from outside the container for igniting the said composition. The heating charge suitably comprises a mixture, in pulverulent form, of solid oxidising and reducing agents adapted on ignition to generate intense heat substantially without the evolution of gas.

According to another feature of the invention, there is interposed between the charge of heating mixture and the vent a heat resisting filter adapted to permit any heated air or gases to pass through it but to filter out solid matter carried thereby, and thus minimise or prevent fume. The walls of the heating charge compartment are suitably constructed of material of good thermal conductivity but if desired and according to a further feature of the invention, a heat insulating lining may be provided between the heating mixture and the conducting material of the heating charge chamber, whereby local overheating effects occasioned by inefficient convection by the comestible may be prevented. According to a still further feature of the invention the heating mixture itself may contain a chemically inert heat absorbing solid of insulating or non-insulating nature as diluent.

The heating charge container may conveniently take the form of a metal tube, closed at one end, of suitable metal and preferably the same material as the material of the can. This may be made from sheet metal by any method yielding a gas tight closure, for instance by drawing or folding, seaming and soldering desirably with tin. This chamber is secured to form a gas tight joint with a perforated plate adapted to form one wall of the can, so that the perforation forms a vent from the heating charge chamber only. The constructional material of the heating charge container and also the seal between the said container and the comestible compartment should be resistant to the thermal and/or chemical action of the heating charge or of the combustion products thereof so that no direct contact can occur between the comestible and the heating charge during storage or use of the device.

The assembly of the parts forming the can and the filling and closure of the comestible compartment and the heating charge chamber may be carried out in any convenient order. Thus the can may be filled with the comestible, sealed and then sterilised and the heating chamber charged and closed thereafter.

The heating mixture may comprise a pulverulent metal, alloy or silicide and a pulverulent oxidising agent that react together when thermally initiated to yield intense heat but little or no gas. Suitable mixtures may be formed for instance from calcium silicide and red lead and/or iron oxide, aluminum and iron oxide, ferrosilicon and red lead, or antimony and potassium permanganate. Other combinations of oxidising and reducing agents may be employed, such as mixtures of antimony, zinc and potassium permanganate; antimony alloys and oxidising agents, such as potassium permanganate; red lead and sulphur; or mixtures of selenium or tellurium with oxidising agents, such as barium peroxide or potassium permanganate. The intensity of the reaction may be controlled by varying the proportion of reducing agent to oxidising agent, or by the inclusion of such ingredients as talc or china clay, but the mixture should be such as to assume a red to white heat when ignited in an uncooled vessel. The mixture may be compressed or caked to minimise its bulk.

The ignition means operable from the exterior may comprise an element adapted to be initiated by a small source of heat such as a match fuzee or the like, for instance a length of touch paper coated with a nitrocellulose composition and dusted with a slag forming igniting mixture, or a length of quick match fuze or some other type of fuze passing through the vent. The fuze composition may itself be of a gasless nature. Percussion or friction ignition means may, however, be provided.

Since the heating mixture may be difficult to ignite, it is in some cases desirable, especially when the mixture has been diluted with inert heat absorbing material, to provide an intermediate priming charge which may advantageously consist of an easily ignitable gasless mixture.

The filtering means may advantageously consist of a plug of glass wool or asbestos and the fuze may pass through or outside it.

The heat insulating lining may consist for instance of asbestos paper or of a mixture of china clay and sodium silicate and may be made in the form of a cup into which the heating charge is filled. It is especially desirable to provide such a lining if the foodstuff is of a viscous or only semi-liquid nature, in order to prevent singeing of material actually in contact with the heating charge chamber, running of the solder in the joints of the latter, or other undesirable local overheating effects.

For storage and transport of the food can the vent and the ignition means may be temporarily closed in, for instance by means of adhesive tape or paper, a press-in lid, a soldered metal tear off or the like.

Before heating the contents of the can it will often be desirable to open the comestible chamber.

Figure 2:
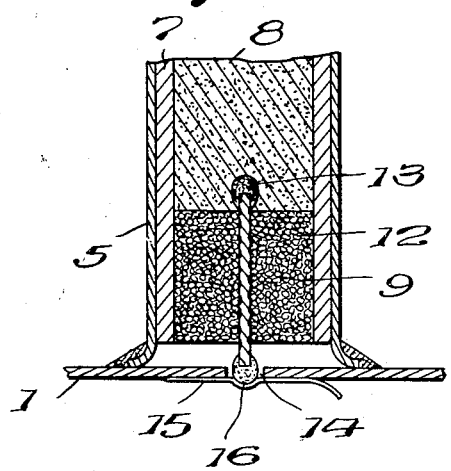
Figure 3:
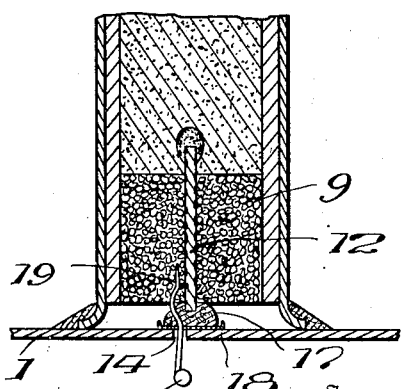

The invention is illustrated in the accompanying drawings, of which Fig. 1 is an axial section through a completed but still unopened can of liquid comestible made according to the invention and standing in an appropriate heating position, and Figs. 2, 3 and 4 are axial sections each of a portion of the heating charge chamber and of the wall to which it is attached, showing various forms of ignition means, and Fig. 5 is an axial section through a container constructed in accordance with the invention and alternative in form to that shown in Fig. 1.

Referring to Fig. 1, I is a perforated plate forming one end wall of a hermetically sealed can formed from tinplate, 2 the opposite end wall and 3 the cylindrical wall over which the plates I and 2 are soldered. 4 is the liquid comestible. 5 is the tinplate cylindrical wall of the heating charge chamber over which the tinplate cap 6 is soldered to form a gas-tight joint. 7 is a heat insulating lining. 8 is the charge of heating mixture yielding a solid residue and 9 a filter consisting of a plug of a mineral fibre. 10 is the flared rim of the heating charge chamber soldered as shown at 11 to form a gas-tight joint through which there is no communication between the said chamber and the comestible chamber at any time. A fuze 12 having its inner end embedded in a bead of an intermediate priming composition 13 extends through a filter 9 and the perforation 14 in the wall I which forms the vent from the heating charge chamber, but stops short under the soldered tear-off 15, which forms a temporary closure preventing the entry of moisture into the heating charge chamber and also preventing any risk of accidental ignition.

In Figs. 2, 3 and 4, the numerals 1, 5, 7, 8, 9, 12, 13, 14 and 15 have the same significance as in Fig. 1.

In Fig. 2, 16 is a match head in which the end of a fuze 12, made from touch paper coated with a nitrocellulose cement and dusted while tacky with an easily ignitable gasless fuze composition, is embedded. The match head 16 projects slightly through the vent 14 and is made of a composition yielding a flame when struck by an ordinary rough surface, or by the side of a safety match box, as desired. The tear-off 15 is slightly domed over the protruding match head 16.

In Fig. 3, 17 is a match head composition, adjacent to the outer end of a fuze 12 of the kind described with reference to Fig. 2, and adhering to a pinhole perforated tray 18 longer and narrower than the diameter of the vent 14, which it bridges. A wire, passing through the perforation in the tray 18, about which the match head composition 17 is formed has an inwardly extending crenellated portion 19 at least terminally coated with friction material by means of an adhesive, and an outwardly extending portion passing through the vent 14 to the exterior, of which the end is looped to form a finger grip 20, which when pulled causes the ignition of the match head composition and hence of the fuze.

In Fig. 4 the end of the fuze 12 is entered through the end of a cap chamber 22 into a hollow anvil 24. A cap 23 charged with a percussion cap composition occupies the open end of the cap chamber 22, which is pressed into a central perforation in the plate 1. The vent 14 takes the form of a number of perforations grouped around the centre of the plate 1.

Although the containers of the present invention may be used in the inverted position shown in the drawings they may also be used in the non-inverted position, i. e. with the vent from the heating chamber at the top, and this is particularly desirable where the heating composition yields a fusible residue.

Referring to Fig. 5, the numerals 1, 2 and 3 represent the top, bottom and cylindrical surface of a can which, without the immersion heater, would hold a pound of liquid comestible 4. The top 1 is centrally perforated and the edges of the perforations turned inwards and soldered with tin to the inside of the tin plate cylindrical heating charge chamber 5. This chamber is approximately an inch in diameter and 4 inches long and is drawn in one piece and has therefore no seams or joints to be soldered except the join with the lid 1. It is fitted with a heat insulating lining 7 made by rolling into a tube an asbestos sheet 12 inches long, 3¾ inches broad and 0.013 inch thick. At the bottom of the chamber is placed a plug 25 made up of 1 gm. of dry asbestos fibre. The charge 8 is placed above the plug and a second plug of mineral fibre 9 is inserted above the charge. This is covered with a centrally perforated cardboard disc 27 which is pressed into position. It will be seen that the margins of the central perforation in the top I overlie the edges of the disk 27 and permanently confine the charge within the charge chamber. Two fuzes 12 are provided which pass through the central perforations of the disc 27 and then separate, one passing down each side of the plug filter to terminate in a fuzehead embedded in the priming mixture. The heating charge chamber is then closed by pressing in the lid 28.

In this can the main heating charge 8 consists of 35 gm. of a mixture of 50% calcium silicide and 50% iron oxide (hammerslag). The priming mixture 26 is made up of 70 parts of red lead, 30 parts calcium silicide and 8 parts of china clay, while the fuzes consist of 3 yarns of 2/10's cotton, impregnated with potassium nitrate to give a nitrate content of about 40% and coated with a 50% solution of nitrocellulose in acetone. To form the fuzeheads 12 at the ends of the fuzes they were dipped into a mixture of 30 parts calcium silicide and 70 parts red lead made into a paste with a small quantity of a 6% solution of nitrocellulose in acetone.

The invention is further illustrated by the following example, in which the parts are parts by weight.

Example

The can is fashioned according to the form of the invention illustrated in Fig. 1 from tinplate one hundredth of an inch in thickness, tinplate of the same thickness being used for the metal of the heating charge container. The heat insulating lining consists of an inner closed tube one tenth of an inch thick made by baking a mixture of china clay and sodium silicate in equal parts. The charge of heating mixture consists of a mixture of 32½ per cent. calcium silicide, 60 per cent. red lead and 7½ per cent. talc. This is poured into position and then tamped. The fuze consists of a length of touch paper which has been dipped in a nitrocellulose cement and dusted while tacky with a mixture of 35 per cent. calcium silicide and 65 per cent. red lead, the inner end of which is dipped in a thick paste made with a suspension of the last mentioned mixture in a nitrocellulose cement and dried off. The bead so formed at the inner end of the fuze is embedded in the heating mixture, which although considerably reduced in bulk by the tamping shows little tendency to cake. A filter of asbestos wool is packed round the fuze over the heating mixture. The free end of the fuze is then trimmed and the joint between the charged heating mixture chamber and the perforated end wall is soldered up and the tear-off is then soldered over the vent. The can is then assembled charged with the comestible, and sealed.

A can holding one pound of liquid made according to this example need only be about 9 to 12 per cent. bulkier than a normal can of this capacity and may advantageously be made of the usual diameter with the heating mixture chamber extending nearly the full length occupied by the comestible. Thus in such a can fashioned according to this example one pound of water is heated from 15 to 70° C. by 2.2 ounces of the heating mixture in less than one and a half minutes.

I claim:

1. A self heating foodstuff container including a compartment containing a comestible, a second compartment extending into said comestible compartment from one wall thereof, said comestible compartment being hermetically sealed, a heating charge disposed in the second compartment and comprising a composition of ingredients capable on ignition of undergoing chemical reaction with the generation of heat but substantially without evolution of inflammable gas or vapor, said charge being compactly disposed within a portion of the said second-named compartment in direct conduction contact with the walls thereof, closure means disposed across the outer extremity of said second named compartment and comprising a permanently mounted, vented portion of said container unit for maintaining the contents of said second compartment in permanent operative relationship, a smoke filter of heat resistant material disposed between said heating charge and the said closure means and being operative to filter out solid matter and suppress smoke liberation from the compartment and combustible ignition means extending through said filter and said closure means for igniting the composition from the exterior of the container.

2. A self heating foodstuff container comprising a substantially cylindrical wall having transverse walls at its axial extremities, providing a cylindrical compartment charged with a comestible, a second compartment extending into said first-named compartment from one end wall thereof, the walls of said comestible compartment being permanently joined and hermetically sealed with respect to the outside atmosphere and with respect to the second-named compartment, a heating charge disposed in the second compartment and comprising a composition of ingredients capable on ignition of undergoing chemical reaction with the generation of heat but substantially without evolution of inflammable gas or vapor, closure means for confining the contents of said second compartment in permanent conductive relationship to the walls thereof and comprising a permanently mounted portion of said container disposed across the outer extremity of the second compartment and at least within the plane of said axial end wall of the container, a filter comprising a plug of heat resistant fibrous material disposed between said heating charge and the said closure means operative to filter out the solid matter and suppress the liberation of smoke from the compartment, and combustible ignition means extending through the filter and the closure means for igniting the composition from the exterior of the container.

3. A self heating foodstuff container as defined in claim 1 wherein said filter comprises a plug of heat resistant fibrous material occupying a substantial space between the heating charge and said closure means.

4. A self heating foodstuff container as defined in claim 2 wherein said plug of heat resistant fibrous material occupies a substantial axial space between the heating charge and said closure means.

5. A self heating foodstuff container as defined in claim 2 wherein said closure means comprises an extension of said end wall of the container.

6. A self heating foodstuff container as defined in claim 2 wherein said permanently mounted portion of the container comprises a vented disk permanently held in operative position by a portion of the said end wall of the container.

7. A self heating foodstuff container comprising a cylindrical wall having transverse walls disposed at its opposite axial extremities and defining a comestible compartment, a second cylindrical member of relatively restricted diameter closed at its inner end and extending into said comestible compartment from one end wall of the comestible compartment, the outer extremity of said second cylindrical member being hermetically sealed to the said end wall of the comestible compartment, said comestible compartment being hermetically sealed, a heating charge disposed in the second compartment and comprising a composition of ingredients capable on ignition of undergoing chemical reaction with the generation of heat but substantially without evolution of inflammable gas or vapor, a portion of said end wall of the container extending across the adjacent extremity of the second compartment and providing a permanently mounted portion of said container unit for enclosing the contents of said second compartment in permanent operative relationship, a filter of heat resistant material disposed between said heating charge and the said permanently mounted enclosing means and operative to filter out solid matter and suppress the liberation of smoke from the compartment, and ignition means extending through the filter and the enclosing means and including a combustible fuse for igniting the composition from the exterior of the container.

8. A self heating foodstuff container including a compartment containing a comestible, a second compartment extending into said comestible compartment from one wall thereof, said comestible compartment being hermetically sealed, a heating charge disposed in the second compartment and comprising a composition of ingredients compactly arranged in substantially direct heat conductive relationship to the comestible, charge confining means disposed across the outer extremity of said second named compartment and comprising a permanently mounted portion of said container unit for confining the contents of said second compartment in permanent operative relationship, a filter of heat resistant material disposed between said heating charge and the said confining means and being operative to filter out solid matter and suppress smoke liberation from the compartment and ignition means extending through said filter and said confining means and including a combustible fuse for igniting the composition from the exterior of the container.

9. A self heating foodstuff container comprising an hermetically sealed comestible receptacle, an inner receptacle contained wholly within said comestible receptacle, immersed in the contents thereof and permanently sealed to one wall thereof, said wall being formed with a vent communicating with said inner receptacle, an ignitable heating charge disposed in said inner receptacle in conduction contact with the walls thereof, a filter in said inner receptacle between said heating charge and vented wall, and ignition means extending through the filter and vented wall and comprising a combustible fuse for igniting the composition from the exterior of the container.

10. A self heating foodstuff container including a compartment containing a comestible, a second compartment extending into said comestible compartment from one end wall thereof, said comestible compartment being hermetically sealed, an ignitable heating charge disposed in the second compartment and comprising a composition of ingredients including solid oxidizing and reducing agents compactly arranged in substantially direct heat conductive relationship to the comestible, a smoke filter comprising a plug of fibrous heat resistant material substantially completely occupying the cross section of the second named compartment above the said heating charge and being operative to suppress smoke liberation from the compartment, a disk disposed above the plug of fibrous material, said disk being vented and said end wall having portions engaging said disk for retaining the disk permanently in position within the said second compartment, and ignition means comprising a combustible fuse extending through said disk and said filter into the vicinity of the heating charge for igniting the charge from the exterior of the container.

11. A self heating foodstuff container comprising an imperforate end wall, an apertured end wall, a substantially cylindrical side wall hermetically sealed to the margins of the end walls and defining a comestible receptacle; an inner, heating material containing receptacle disposed entirely within the first mentioned receptacle in direct heat conducting contact with the contents thereof and substantially permanently carried by and hermetically sealed to said apertured end wall, and serving to seal the comestibles from the aperture therein, a heating charge comprising a composition of ingredients capable on ignition of undergoing chemical reaction with the generation of heat but substantially without the generation of inflammable gas or vapor disposed in the inner receptacle in heat conducting relation to the walls thereof, a filter plug of fibrous refractory material in the inner receptacle, coextensive in cross sectional area therewith, between the charge and the aperture in the container end wall, combustible ignition means extending through the filter for igniting the heating charge from the exterior, and means constituted at least in part by said apertured end wall for preventing removal of said charge and said filter, whereby the inner and outer receptacles and their contents may be packed, shipped, and handled as a unitary structure.

12. A self heating foodstuff container comprising an imperforate end wall, an apertured end wall, a substantially cylindrical side wall hermetically sealed to the margins of the end walls and defining a comestible receptacle; an inner, heating material containing receptacle disposed entirely within the first mentioned receptacle in direct heat conducting contact with the contents thereof and substantially permanently carried by and hermetically sealed to said apertured end wall, and serving to seal the comestibles from the aperture therein, a heating charge comprising a composition of ingredients capable on ignition of undergoing chemical reaction with the generation of heat but substantially without the generation of inflammable gas or vapor disposed in the inner receptacle, a layer of heat insulating material between and in contact with said charge and the walls of the inner receptacle to modulate and control the transfer of heat to said walls, a filter comprising a plug of refractory fibrous material in the inner receptacle between the charge and the aperture in the container end wall, combustible ignition means extending through the filter for igniting the heating charge from the exterior, and means constituted at least in part by said apertured end wall for preventing removal of said charge and said filter, whereby the inner and outer receptacles and their contents may be packed, shipped, and handled as a unitary structure.

WALTER ANDERSON CALDWELL.